C. H. AND H. W. VIEBROCK.
NUT LOCK.
APPLICATION FILED OCT. 17, 1919.

1,346,730.

Patented July 13, 1920.

Inventors
C. H. Viebrock &
H. W. Viebrock.

By
Attorney

UNITED STATES PATENT OFFICE.

CARL H. VIEBROCK AND HENRY W. VIEBROCK, OF DOUGLAS, WASHINGTON, ASSIGNORS OF ONE-TENTH TO HENRY PLANETZ, OF DOUGLAS, WASHINGTON.

NUT-LOCK.

1,346,730.  Specification of Letters Patent.  Patented July 13, 1920.

Application filed October 17, 1919. Serial No. 331,305.

*To all whom it may concern:*

Be it known that we, CARL H. VIEBROCK and HENRY W. VIEBROCK, citizens of the United States, residing at Douglas, in the county of Douglas and State of Washington, have invented certain new and useful Improvements in Nut-Locks; and we do hereby declare the following to be a full, clear, and exact description of the invention, such as will enable others skilled in the art to which it appertains to make and use the same.

This invention relates to nut locks and the primary object of the invention is to provide an improved means for effectively locking a nut on a bolt against accidental displacement after the same has been adjusted to a set position.

Another object of the invention is to provide a two-part nut having means formed on one end thereof adapted to be brought into locking engagement with the threads by the other section so as to prevent displacement of the nut from the bolt.

A further object of the invention is to provide an improved nut lock embodying a pair of sections, one of the sections having a cone formed on one end thereof arranged to be brought into engagement with the threads of the bolt, the slots being formed in the cone in such a manner as to prevent weakening thereof and permit the outer end of the cone to be forced into engagement with the threads prior to the inner portion thereof.

A further object of the invention is to provide an improved washer adapted to coöperate with one of the nut sections for bringing the split cone member into locking engagement with the threads.

A still further object of the invention is to provide an improved nut lock of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1:
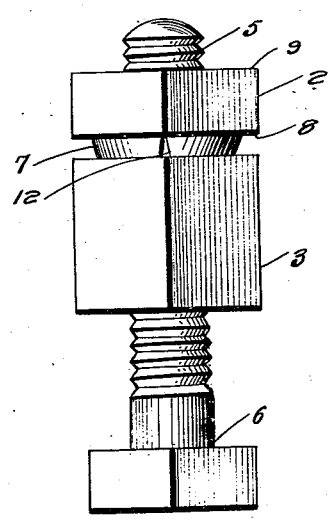
Figure 1 is a side elevation of the improved nut lock showing the same in adjusted position on a bolt.
Figure 2:
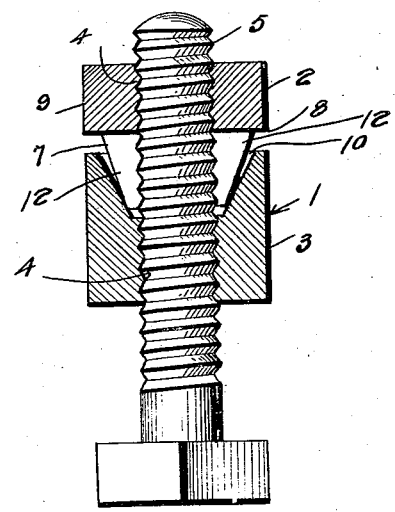
Fig. 2 is a longitudinal section through the same.
Figure 3:
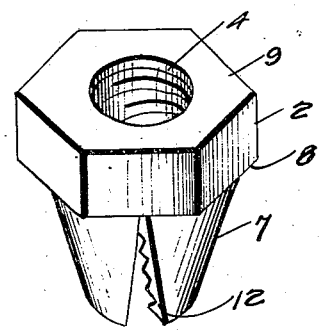
Fig. 3 is a detail perspective view of one of the nut sections.

Referring to the drawings in detail, wherein similar reference characters designate corresponding parts throughout the several views, the numeral 1 generally indicates the improved nut which includes a pair of sections 2 and 3 having alined threaded bores 4 which are adapted to receive the threaded shanks 5 of the ordinary or any preferred form of bolt 6.

The outer nut section 2 is provided with a reduced frusto-conical extension 7 and the point of connection of the frusto-conical member 7 forms an abrupt shoulder 8 with the body of the nut section 9 for limiting the inward movement of the frusto-conical member in the nut section 3. The frusto-conical extension 7 tapers downwardly at substantially an angle of 78° to the horizontal and the same is adapted to be received in a conical shaped opening 10 formed in the nut section 3, which is formed by enlarging the upper end of the nut section. The tapered opening is inclined downwardly and inwardly at substantially an angle of 68° to the horizontal, so that the opening shall have a less inclination than the frusto-conical extension, so that the outer end of the frusto-conical extension will come into engagement with the walls of the opening prior to the upper portion thereof.

The frusto-conical extension 7 is provided with a plurality of equidistantly spaced inwardly extending V-shaped slots 12 and these slots form means for permitting the frusto-conical extension to readily contract when the nut section 2 is threaded on the bolt and into engagement with the nut section 3.

The formation of the slots in the frusto-conical extension 7 permits the extension to be readily and easily contracted and the inclination of the extension and the opening permits the extension to gradually contract from its outer end toward the inner end.

In operation of the improved device, the nut section 3 is threaded into engagement with the work and the outer nut section 2 is then turned on the bolt and brought into tight engagement with the section 3 and the frusto-conical extension coming into engagement with the tapered walls of the recess 10 contracts the same and forces the extension into tight engagement with the threads of the bolt.

The inward movement of the extension 7 is limited by the shoulder 8, which engages the upper surface of the inner nut section 3.

Figure 5:
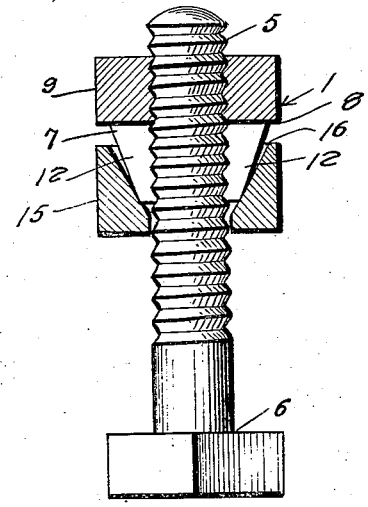
Fig. 5 is a detail longitudinal section through a modified form of nut lock.
Figure 4:
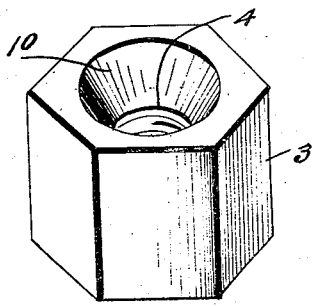
Fig. 4 is a detail perspective view of the other nut section.

In Fig. 5 is illustrated a slightly modified form of the invention and in this construction, a washer 15 is employed having its upper end provided with inwardly extending tapered opening 16 and the angle of the inclination of said extension is less than the angle of the frusto-conical extension 7 of the nut section 2 in connection with which the washer 15 is used.

In operation of the modified form, the washer 15 is placed upon the bolt in tight engagement with the work and the nut section 2 is then turned on the bolt and brought into engagement with the washer which contracts the frusto-conical extension in the same manner as the nut section 3.

The tapered opening 16 and also the tapered opening 10 in the nut section 3 is of greater length than the frusto-conical extension, so as to permit the same to be wholly received in the openings.

From the foregoing description it can be seen that an improved nut lock is provided in which the nut is firmly locked in position on the bolt so that accidental displacement thereof is prevented.

In practice, we have found that the form of our invention illustrated in the accompanying drawings and referred to in the above description, as the preferred embodiment, is the most efficient and practical; yet realizing the conditions concurrent with the adoption of our device will necessarily vary, we desire to emphasize that various minor changes in details of construction, proportion and arrangement of parts may be resorted to, when required without sacrificing any of the advantages of our invention as set forth.

What we claim as new is:

In a nut lock, the combination with a threaded bolt, an inner member having a conical shaped opening in its outer portion and slidably mounted on said threaded bolt, an outer locking member provided with a frusto-conical extension divided into sections by spaced inwardly directed V-shaped slots opening upon the small free end thereof to permit the small ends of the sections to be forced toward one another and clamped upon the threads of the bolt as the outer member is threaded upon the bolt toward the inner locking member and the frusto-conical extension thereby forced into the conical shaped opening of the inner locking member and brought into binding engagement with the walls of said conical shaped opening, said frusto-conical extension having a greater inclination than the said conical shaped opening of the inner locking member whereby the sections will be readily forced toward the threaded bolt and caused to bind upon the thread thereof as the frusto-conical extension moves into the said conical opening of said inner locking member.

In testimony whereof we affix our signatures in presence of two witnesses.

CARL H. VIEBROCK.
HENHY W. VIEBROCK.

Witnesses:
MAY G. MOORE,
R. T. SPAULDING.